US011306705B2

(12) United States Patent
Liu et al.

(10) Patent No.: US 11,306,705 B2
(45) Date of Patent: Apr. 19, 2022

(54) SYSTEM AND METHOD FOR MONITORING A DEVICE

(71) Applicant: City University of Hong Kong, Kowlonn (HK)

(72) Inventors: Xin Liu, Kowloon (HK); Zijun Zhang, Kowloon Tong (HK)

(73) Assignee: City University of Hong Kong, Kowloon (HK)

( * ) Notice: Subject to any disclaimer, the term of this patent is extended or adjusted under 35 U.S.C. 154(b) by 199 days.

(21) Appl. No.: 16/592,815

(22) Filed: Oct. 4, 2019

(65) Prior Publication Data
US 2021/0102527 A1  Apr. 8, 2021

(51) Int. Cl.
F03D 17/00 (2016.01)
G06N 3/08 (2006.01)
G05B 23/02 (2006.01)
G06N 3/04 (2006.01)

(52) U.S. Cl.
CPC ......... F03D 17/00 (2016.05); G05B 23/0254 (2013.01); G06N 3/0454 (2013.01); G06N 3/08 (2013.01); F05B 2260/80 (2013.01); F05B 2260/84 (2013.01)

(58) Field of Classification Search
CPC ........ F03D 17/00; G06N 3/08; G06N 3/0454; G05B 23/0254; F05B 2260/84; F05B 2260/80
See application file for complete search history.

(56) References Cited

U.S. PATENT DOCUMENTS

| 10,031,048 | B2 | 7/2018 | Lim et al. |
| 10,041,475 | B1* | 8/2018 | Badrinath Krishna ... F03D 9/25 |
| 10,343,784 | B2* | 7/2019 | Nakhjavani ............ F01D 17/02 |
| 10,387,775 | B2* | 8/2019 | Cheng ..................... G06N 20/20 |
| 10,691,133 | B1* | 6/2020 | Abeloe .................. G06N 3/084 |
| 10,832,087 | B1* | 11/2020 | Wang ................. H04B 17/3913 |
| 10,867,250 | B2* | 12/2020 | Srinivasan ............. G06N 20/00 |
| 10,956,807 | B1* | 3/2021 | Abeloe ..................... G06N 3/08 |
| 10,984,154 | B2* | 4/2021 | Wang ...................... G06F 30/20 |
| 2002/0002414 | A1* | 1/2002 | Hsiung .............. G05B 23/0235 700/95 |
| 2012/0317058 | A1* | 12/2012 | Abhulimen .......... G06N 3/0427 706/2 |
| 2014/0249876 | A1* | 9/2014 | Wu ........................ G05B 15/02 705/7.12 |
| 2018/0223814 | A1* | 8/2018 | Badrinath Krishna ..................... G06N 3/084 |
| 2019/0203696 | A1* | 7/2019 | Kaucic .................... F03D 17/00 |

(Continued)

OTHER PUBLICATIONS

L. Wang, Z. Zhang, J. Xu and R. Liu, "Wind Turbine Blade Breakage Monitoring with Deep Autoencoders," Transactions on Smart Grid, 2016.

(Continued)

Primary Examiner — Mohammad K Islam
(74) Attorney, Agent, or Firm — Renner Kenner Greive Bobak Taylor & Weber

(57) ABSTRACT

A system and a method for monitoring a device including the steps of obtaining operation information from a device, wherein the operation information is associated with the condition of the device in operation; and processing the operation information with a device modelling engine to determine one or more operation conditions of the device.

22 Claims, 9 Drawing Sheets

(56) References Cited

U.S. PATENT DOCUMENTS

| | | | | |
|---|---|---|---|---|
| 2019/0362070 | A1* | 11/2019 | Abbaszadeh | G06F 21/554 |
| 2020/0049129 | A1* | 2/2020 | Girardot | F03D 7/046 |
| 2020/0186549 | A1* | 6/2020 | Nogin | H04L 63/1433 |
| 2020/0201950 | A1* | 6/2020 | Wang | F03D 17/00 |
| 2020/0210538 | A1* | 7/2020 | Wang | G06F 30/20 |
| 2020/0210824 | A1* | 7/2020 | Poornaki | G05B 23/0254 |
| 2020/0341878 | A1* | 10/2020 | Chaturvedi | G06F 11/008 |
| 2020/0379424 | A1* | 12/2020 | Wang | G06Q 50/06 |
| 2020/0379454 | A1* | 12/2020 | Trinh | G06N 3/0454 |
| 2020/0387579 | A1* | 12/2020 | Barr | G06F 30/367 |
| 2020/0394470 | A1* | 12/2020 | Ganapavarapu | G06K 9/6257 |
| 2021/0203157 | A1* | 7/2021 | Visweswariah | G06N 3/0445 |

OTHER PUBLICATIONS

M. Sakurada, T. Yairi, "Anomaly Detection Using Autoencoders with Nonlinear Dimensionality Reduction", Proceedings of the MLSDA, 2014.

G. Jiang, P. Xie, H. He, J. Yan, "Wind Turbine Fault Detection Using a Denoising Autoencoder with Temporal Information", Transaction on Mechatronics, vol. 23, 2017.

* cited by examiner

SYSTEM AND METHOD FOR MONITORING A DEVICE

TECHNICAL FIELD

The present invention relates to a system and method for monitoring a device, and particularly, although not exclusively, to a system and method which uses machine learning to monitor the operation conditions of one or more devices.

BACKGROUND

The monitoring of plant, equipment and various devices has been a challenge to control systems engineers in recent times as such large scale plants and equipment have become much more widespread. In addition to the coordinate efforts in operating such equipment efficiently, there is also a need to operate these plants and equipment safely as safety standards have improved over time.

Monitoring systems have been developed for various plants and equipment, but often, such systems are complex and require many sensors, monitoring equipment and expert personal so as to diagnose and respond to problems or failures. In turn, these monitor systems itself are becoming more complex and expensive which as systems become more and more complex, they are in turn more prone to failure. This has adversely affecting the efficient of such systems perform its core functions in the first place.

SUMMARY OF THE INVENTION

In accordance with a first aspect of the present invention, there is provided a method for monitoring a device comprising the steps of:
 obtaining operation information from a device, wherein the operation information is associated with the condition of the device in operation; and
 processing the operation information with a device modelling engine to determine one or more operation conditions of the device.

In an embodiment of the first aspect, the device modelling engine includes a plurality of matching networks for processing the operation information of a plurality of devices.

In an embodiment of the first aspect, each of the plurality of matching networks is arranged to be associated with an individual device of the plurality of devices.

In an embodiment of the first aspect, the plurality of matching networks are generated for each of the associated devices by training a base matching network with a domain data set.

In an embodiment of the first aspect, the domain data set includes operation information from the plurality of devices.

In an embodiment of the first aspect, the base matching network is further processed by training the base matching network with a target data set associated with the individual device so as to generate each of the matching networks for each of the individual devices.

In an embodiment of the first aspect, the target data set includes operation information for each of the individual devices.

In an embodiment of the first aspect, the target data is used to fine tune the base matching network into the each of the matching networks for each of the individual devices.

In an embodiment of the first aspect, the based matching network is a deep neural network.

In an embodiment of the first aspect, the structure of the deep neural network is adjusted based on a stopping criterion.

In an embodiment of the first aspect, the stopping criterion is determined based on a reconstruction error obtained from the deep neural network.

In an embodiment of the first aspect, the reconstruction error is obtained by inputting the domain data set into the deep neural network.

In an embodiment of the first aspect, the structure of the deep neural network is adjusted by inserting one or more hidden layers into the deep neural network.

In an embodiment of the first aspect, the one or more hidden layers inserted by adding one or more hidden nodes into the hidden layers.

In an embodiment of the first aspect, weights or biases of the deep neural network are manipulated when the deep neural network is adjusted.

In an embodiment of the first aspect, the device is a wind turbine.

In accordance with a second aspect of the present invention there is provided a system for monitoring a device comprising:
 a device conditions gateway arranged to obtain operation information from a device, wherein the operation information is associated with the condition of the device in operation; and
 a conditions monitoring engine arranged to process the operation information with a device modelling engine to determine one or more operation conditions of the device.

In an embodiment of the second aspect, the device modelling engine includes a plurality of matching networks for processing the operation information of a plurality of devices.

In an embodiment of the second aspect, each of the plurality of matching networks is arranged to be associated with an individual device of the plurality of devices.

In an embodiment of the second aspect, the plurality of matching networks are generated for each of the associated devices by training a base matching network with a domain data set.

In an embodiment of the second aspect, the domain data set includes operation information from the plurality of devices.

In an embodiment of the second aspect, the base matching network is further processed by training the base matching network with a target data set associated with the individual device so as to generate each of the matching networks for each of the individual devices.

In an embodiment of the second aspect, the target data set includes operation information for each of the individual devices.

In an embodiment of the second aspect, the target data is used to fine tune the base matching network into the each of the matching networks for each of the individual devices.

In an embodiment of the second aspect, the based matching network is a deep neural network.

In an embodiment of the second aspect, the structure of the deep neural network is adjusted based on a stopping criterion.

In an embodiment of the second aspect, the stopping criterion is determined based on a reconstruction error obtained from the deep neural network.

In an embodiment of the second aspect, the reconstruction error is obtained by inputting the domain data set into the deep neural network.

In an embodiment of the second aspect, the structure of the deep neural network is adjusted by inserting one or more hidden layers into the deep neural network.

In an embodiment of the second aspect, the one or more hidden layers inserted by adding one or more hidden nodes into the hidden layers.

In an embodiment of the second aspect, weights or biases of the deep neural network are manipulated when the deep neural network is adjusted.

In an embodiment of the second aspect, the device is a wind turbine.

In an embodiment of the second aspect, the system further comprises a pre-processor arranged to process the operation information obtained from the device conditions gateway.

In an embodiment of the second aspect, the operation information is pre-processed before the information is inputted to the device modelling engine.

In an embodiment of the second aspect, the operation information is pre-processed to remove fault data from the operation information.

In an embodiment of the second aspect, the device conditions gateway is a SCADA system.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
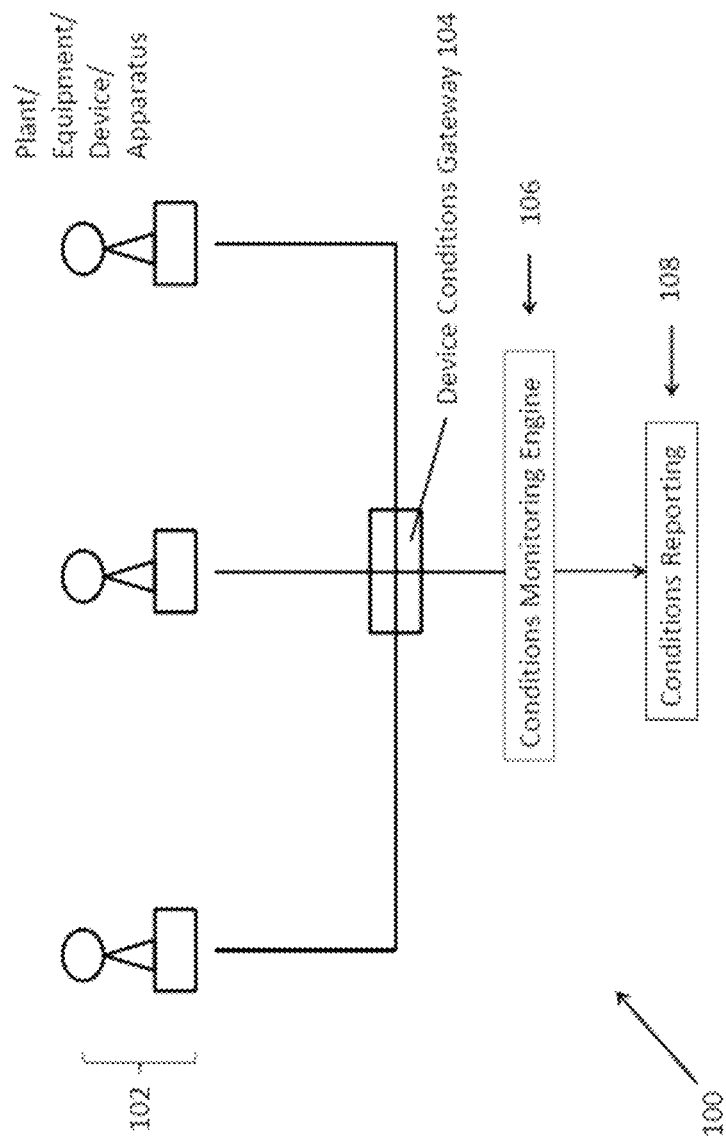
FIG. 1 is a block diagram illustrating a system for monitoring a device in accordance with one embodiment of the present invention.

Referring to FIG. 1, there is provided an example embodiment of a system for monitoring a device comprising:
a device conditions gateway arranged to obtain operation information from a device, wherein the operation information is associated with the condition of the device in operation; and
a conditions monitoring engine arranged to process the operation information with a device modelling engine to determine one or more operation conditions of the device.

In this example embodiment, the system for monitoring a device 100 includes at least a device conditions gateway 104 and a conditions monitoring engine 106. The device conditions gateway 104 is arranged to obtain operation information for one or more devices 102 whilst the conditions monitoring engine 106 is arranged to process this operation information for the one or more devices 102 so as to determine one or more operation conditions for the device or devices 102. These operation conditions in turn can be used for further processing or user review so as to determine the status and condition of the device itself to diagnose, predict or solve problems for the device 108. Preferably, the conditions monitoring engine 106 includes a device modelling engine 204 which is arranged to process the operation information by use of a generated model associated with the device 102 being monitored so as to devise one or more operations of the device 102.

Example embodiments of the system for monitoring a device 100 may be used to monitor the conditions of a device 102. Preferably, although not necessarily, the device 102 would operate with a plurality of other associated devices 102 to perform a certain task or goal. Such devices 102 may include any equipment, fixture, plant, vehicle or apparatus that may be arranged to operate, individually, partially or completely together to perform one or more tasks. Examples of such devices may include wind turbines in a wind farm, as illustrated in some of the example embodiments described below. Other devices, such as coal powered generators, nuclear power generators, trains, drilling/boring machines, transportation systems, signalling systems, oil rigs, pumps, radar arrays, radio transmitters, lifts/escalators, air conditioning systems, telecommunication equipment and exchanges, computer servers, may also operate with examples of the systems for monitoring a device 100.

Preferably, the various examples of systems for monitoring a device 100 may be arranged to receive condition information from each of the devices 102 that are being monitored. Such condition information may include any information that relates to or otherwise associated with the condition of the device before, during and after operation or the performance of any tasks. Such condition information or device data may be specific to the device itself, including operations status, health checks, operation duration, operating rates, temperature, surrounding conditions etc or any information that is associated with the status or health of the device itself. As the person skilled in the art would appreciate, such condition information will depend on the specific device that is being monitored as condition information will be different for a range of different devices.

In the examples described below, the system 100 is arranged to operate with wind turbines of a wind farm, and thus the condition information for wind turbines (the devices) are relevant to wind turbines generally. Such information may include, without limitations, turbine rotation rates, gear box rotation rates, gearbox temperature, power generation rates, surrounding wind speeds, surrounding wind deviations, detectable vibrations, tower accelerations, drive train accelerations, torque change rates, blade pitch angles, torque measured at turbine and gearbox, etc. These variables may be measured periodically and stored over a time period for further analysis and processing to determine or estimate the wind turbine's health, operation status or for the prediction of operation characteristics or forecasts of certain operation results or problems. As it will be described below, embodiments of the system for monitoring a device may be used to process these variables of the condition information for a wind turbine so as to report and to report and to predict the wind turbine's operation condition.

As shown in FIG. 1, the operation information of each of the one or more devices is collected by a device conditions gateway 104. The device conditions gateway 104 may be a centralised system arranged to communicate with various sensors that are operating with each of the one more devices to take various measurements relevant to the operation condition of the device. Preferably, an example of a device conditions gateway 104 may include part or all of a Supervisory Control and Data Acquisition (SCADA) system which is used to monitor and control various devices that are in operation. Such devices may include plant, equipment, devices or appliances in various industries or applications. The SCADA system may be implemented to obtain various operation parameters which are specific to the devices that are being monitored and controlled by the SCADA systems.

As the device conditions gateway 104 obtains various parameters collectively as condition information of the devices, the condition information is then communicated to the conditions monitoring engine for processing. In this example embodiment, the conditions monitoring engine 106 is arranged to process the condition information obtained by the conditions gateway so as to devise and report a specific condition for the device. This specific condition could be a present condition as well as a future condition that may be predicted based on the condition information that is obtained by the device conditions gateway and processed by the condition information engine 106.

The example embodiments of the system for monitoring a device 100 may be advantageous as it allows for the detection and prediction of any operation conditions of a device. By processing the operation information, any abnormal conditions for a device may be identified quickly or predicted such that suitable actions can be undertaken to reduce the risk of damage or to maintain the safe operation of the device.

Figure 2:
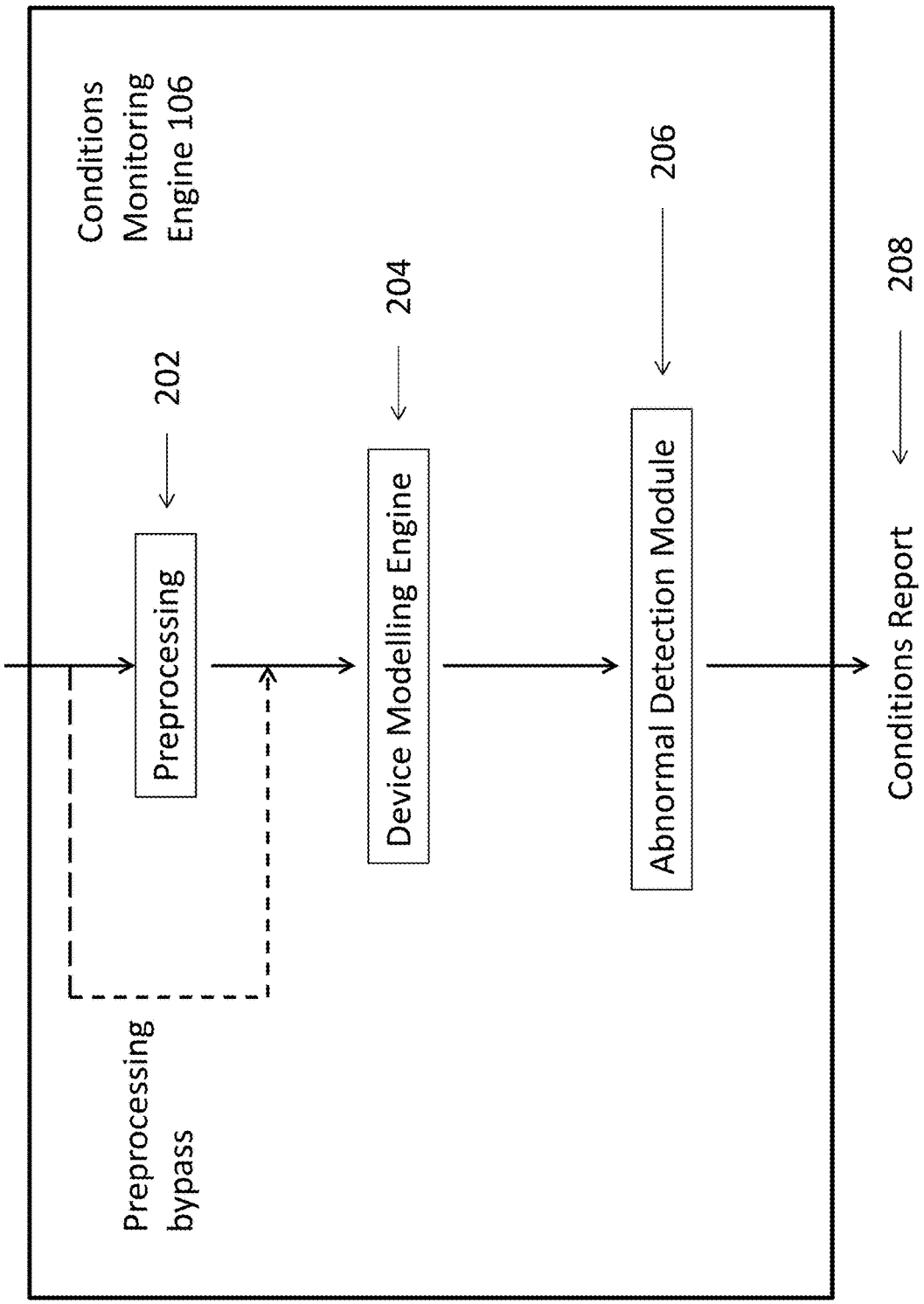
FIG. 2 is a block diagram of an example conditions monitoring engine as used in the system of FIG. 1.

With reference to FIG. 2, there is illustrated a block diagram of the conditions monitoring engine 106 which is arranged to process the operation information of the devices when it is obtained by the device conditions gateway. In this example embodiment, the device modelling engine includes an optional pre-processing module 202 arranged to pre-process the conditions information before inputting the pre-processed conditions information into the device modelling engine 204 where the conditions information is applied to a previously generated model representative of the device so as to determine or predict the operation conditions of the device as based on the condition information obtained for the device. In turn, when this determination or prediction is made, the abnormality detection module 206 is arranged to process this determination or prediction such that a conditions report regarding the device can be provided to a user or for further processing 208.

As shown in FIG. 2, the pre-processing module 202 is arranged to filter out any fault data, noise or any unnecessary data. As it will be described with reference to FIGS. 3 to 9, as the device modelling engine 204 is preferably implemented by use of a machine learning architecture, including a plurality of learning networks, the removal of any zero (null) data, fault data or noise by the pre-processing module is optional, but may improve the ability to train or pattern match within these machine learning processes. This will in turn improve the accuracy of the device modelling engine 204 to acquire the necessary knowledge to perform a suitable pattern matching or classification process in its subsequent processing of the operation information to determine operation conditions of the device.

Once the operation information has been pre-processed, the information is in turn inputted into the device modelling engine 204 which is arranged to model the device to which the information is associated with. The device modelling engine 204 may include a machine learning system which uses machine learning to recognize the parameters and operations of a particular device after training as a particular state or classification, and thus the different conditions of the device, after training, can be recognized within a level of accuracy based on operation information that is fed within it.

Preferably, the device modelling engine 204 includes a plurality of learning networks, each specifically structured and trained for each individual devices of a plurality of devices. Thus in the examples described below, where the device is a wind turbine in a wind farm which has multiple devices (wind turbines), each of the plurality of learning networks may be individually structured and trained to operate with a specific wind turbine of the wind farm. In turn, when operation information obtained for a specific wind turbine is fed into an associated learning network, the operation conditions of the specific wind turbine can be modelled by the learning network and thus any abnormal functionalities or status updates of each wind turbine can be determined or predicted based on the matching of the operation information against the modelling of the wind turbine by the learning network.

Figure 3:
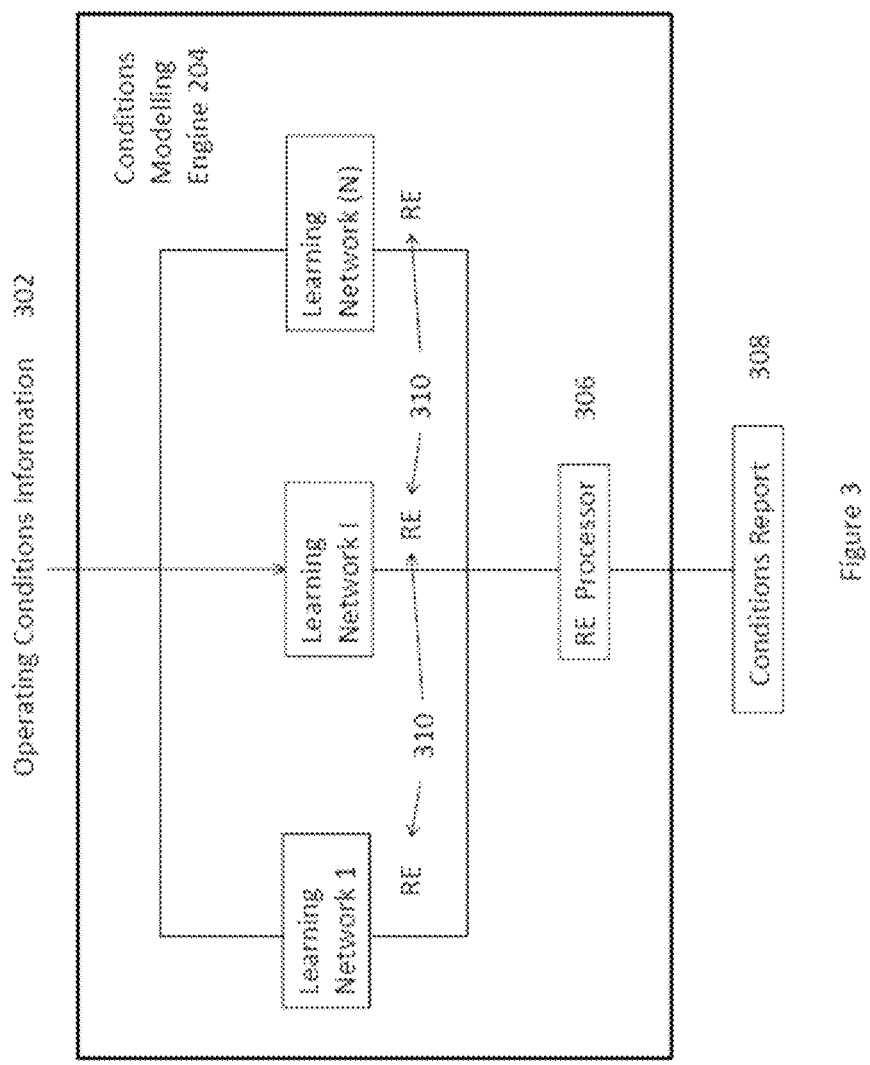
FIG. 3 is a block diagram of an example device modelling engine of the monitoring engine of FIG. 2.

With reference to FIG. 3, there is illustrated a block diagram of an example device modelling engine 204. In this embodiment, the engine 204 includes a plurality of learning networks 304 (network 1, network i and network N), denoting the first network, the ith network and the Nth network. The number of learning networks 304 that are included within the modelling engine 204 may preferably be the number of devices that are being monitored by the system. These learning networks are arranged to model an individual device which is being monitored and thus when operation information 302 are fed into each of these learning networks 304, the learning networks 304 are arranged to identify specific patterns which have matched the combination of the operation information that has been fed into the network and in turn, provide an output that may be one or more classifications of a particular condition of the device itself.

Once these matches are found, existing knowledge stored within each network 304 as generated by past training may classify one or more conditions of the device. Such conditions may in turn infer the existing or forecast conditions of the device in operation and thus a report on the conditions of the device can be generated.

In one example embodiment, a reconstruction error (RE) 310 can be obtained by comparing the output of the learning networks 304 against measured conditions of the device in operation. This comparison, which can be presented as a RE value 304 or vector can in turn be an indication of any abnormalities in the operation of the device and can be processed by a RE processor 306. This is further described below with reference to FIGS. 4 and 7 where the RE is compared with an upper limit and a lower limit, and where the RE falls outside of these limits, would therefore indicate an abnormal operation condition with the device.

Figure 4:
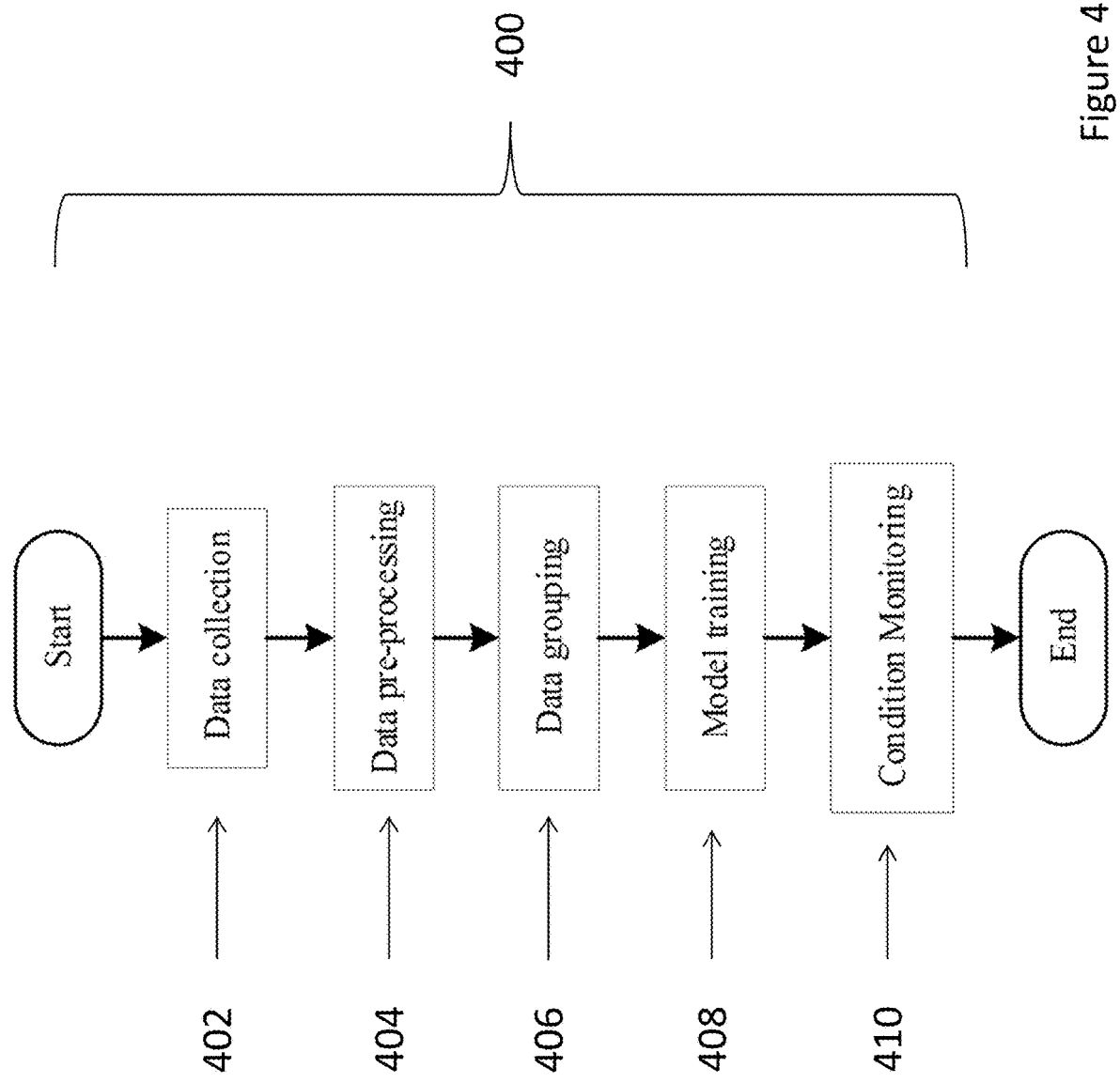
FIG. 4 is a data flow diagram of an example method for monitoring a device in accordance with another embodiment of the present invention.

With reference to FIG. 4, there is illustrated another example of a method for monitoring a device. This method will be described with reference to FIGS. 4 to 9 and will refer to the usage of the method for monitoring wind turbines, although as it would be appreciated by a person skilled in the art, any other devices, plant, equipment or apparatus may also be monitored.

As shown, this method includes the process of training the plurality of learning networks, which once trained, may no longer be necessary to operate the method for monitoring the devices. However, periodic or on-going training may increase further knowledge within the machine learning structure of the system and method for monitoring devices and therefore increasing the accuracy of the method in operation.

In this example embodiment, the method includes five steps 402, 404, 406, 408, 410. These are operation information collection (data collection) 402, operation information pre-processing (data pre-processing) 404, operation information grouping (data grouping) 406, device model training 408 and condition monitoring 410.

Initially, when the method is started for the monitoring of devices, operation information or operation data for each of the devices are first collected. This information may then be processed by the device modelling engine mentioned earlier with reference to FIGS. 1 to 3 should the models have already been generated. However, in the first instance when these models have not yet been generated, steps 402, 404, 406 and 408 are therefore undertaken so as to generate the models of the devices which will be used to perform the processing of the operation information.

This step of generating the models of the devices is preferably performed by training a machine learning system having learning networks such as deep neural networks (DNN). In a first instance, operation information or operation data of each of the devices may be firstly obtained from a control or monitor system such as SCADA systems of the wind farm (402). The data may then be transformed and processed into files, such as spreadsheet files that may enable the data pre-processing 404 and further model training 408 which follows.

The operation data may then be pre-processed 404, although as it would be appreciated, since a machine learning system is used to process the data, the pre-processing of data 404 is optional and thus data which are not pre-processed may nonetheless operate with a machine learning systems. The pre-processing process 404 may include a step of filter out any fault operating data in accordance with records as found in an associated fault log and thus leaving only the data under normal condition. As an example, SCADA parameters, e.g. features for modelling the wind turbines, may not need to be carefully selected but preferably, the features which are filtered out may include those parameters which remain constant in all records of a wind turbine. The data may then be scaled to the range in [0, 1] or the like based on the maximum and minimal value of each feature such that they can be consistently represented when processed by the learning networks.

Once the data has been scaled to the ranges, the data is then grouped 406 for model training 408. The grouping process 406 is arranged to separate the operation data into a source domain set and a target domain set. The source domain set may comprise of a portion of the operation information from a plurality of wind turbines and thus form a common training set that would train a learning network with operation information that is shared amongst a plurality of wind turbines. This is advantageous as a plurality of wind turbines are likely to collectively provide a much larger data set for training, although the disadvantage is that such a training set would be for wind turbines generally, and not specific to an individual turbines.

The target domain data set may then be used to further train the learning network after the training is performed with the source domain set. In this process, the source domain set trained learning network is then "fine tuned" individually to each wind turbine as the target domain data is obtained from each individual wind turbine. In this way, the source domain set trained learning network is then adapted or transferred into an individual learning network for each individual wind turbine. This is advantageous as the domain adaptation or transferred learning process allows a trained learning network with knowledge developed by training with a larger set of data (many wind turbines) to be specifically adapted or transferred to work with an individual wind turbine that would on its own have a much small set of training data. These processes, including the grouping of operation information 406 into source domain data set and target data set as well as the training process 408 is further described below with reference to FIGS. 5 to 9.

Figure 5:
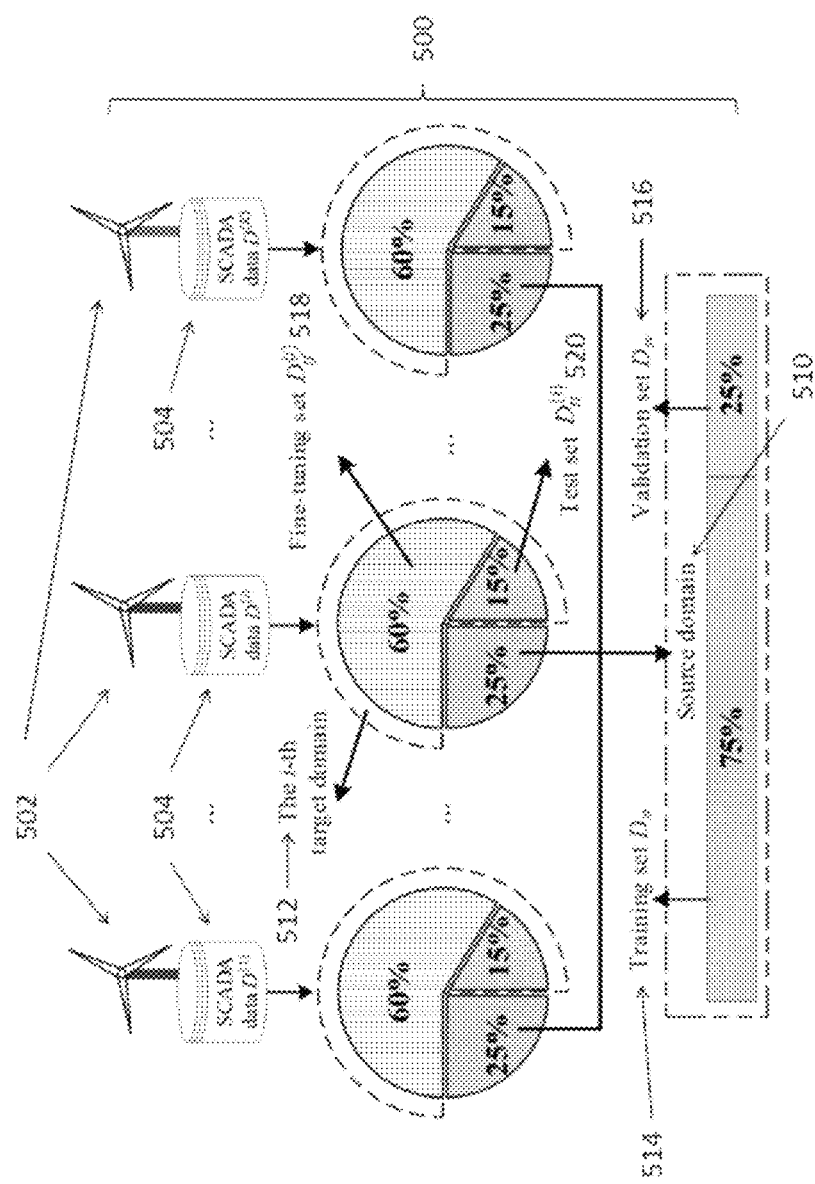
FIG. 5 is a diagram illustrating an example grouping of operation information into a source domain set and a target domain set for training the conditions monitoring engine of FIG. 2.

With reference to FIG. 5, there is shown an example embodiment 500 of data grouping 406 for the method of monitoring a device as shown in FIG. 4. In this example, the method is arranged to monitor a plurality of wind turbines 502 of a commercial wind farm having K wind turbines (WT).

Accordingly, the SCADA data of K WTs 504 are collected 402 and pre-processed 404 through the mentioned process above which in this embodiment, the data 504 can be represented as $D^{\{i\}}$, i=1, 2, ..., K. Suppose that $D^{\{i\}}$, i=1, 2, ..., K, has the identical r-dimensional feature space (a set of SCADA parameters) and can be further expressed as $D^{\{i\}} = \{X_1^{\{i\}}, X_2^{\{i\}}, \ldots, X_M^{\{i\}}\}$, where M means the total number of data points in $D^{\{i\}}$.

Figure 6:
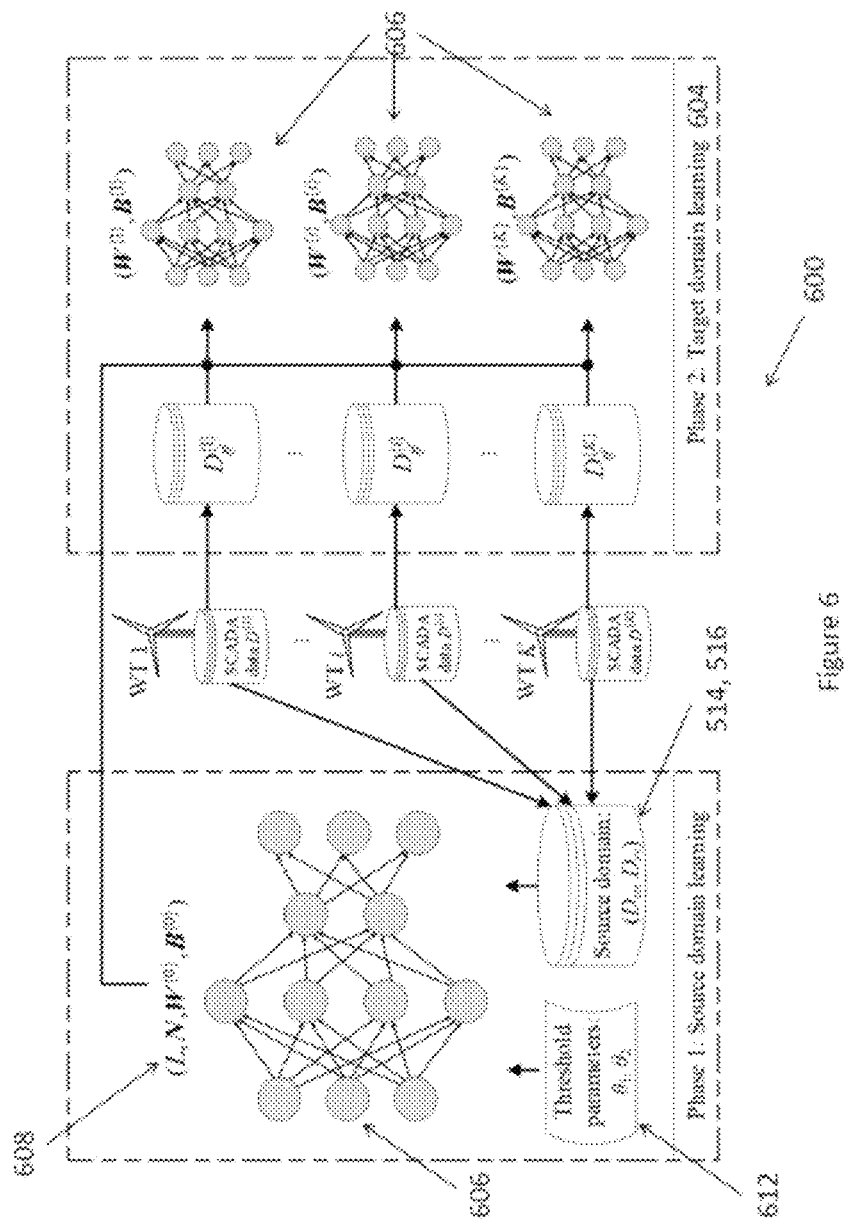
FIG. 6 is a block diagram illustrating an example method of training one or more learning networks.

As shown in FIGS. 5 and 6, an example of the facilitation of a transfer learning process is shown. The process includes two phases: a source domain learning phase 602 and a target domain learning phase 604. The source domain learning phase 602 is arranged to pre-train a model that extracts the common data patterns existing among all WTs 502, while the target domain learning phase can customize the unique characteristics of each WT by fine-tuning the pre-trained model using the individual dataset and thus allowing the individual pre-trained model, which has been fine tuned to a specific WT to model that specific WT.

To enable the two-phase training scheme, the source domain 602 and target domain 604 can be constructed as shown in FIGS. 5 and 6, where $D^{\{i\}}$ is divided into two parts:
  one for constructing the source domain 510, and
  the other for its own target domain 512.

The source domain 510 may contain the parts of data from all WTs is further divided to source domain training set $D_{st}$ 514 and source domain validation set $D_{sv}$ 516. The target domain of the i-th WT 512 is split into fine-tuning set $D_{tf}^{\{i\}}$ 518 and test set $D_{tt}^{\{i\}}$ 520.

Once the data grouping is performed, the model training process is ready to begin. This step is to train each of the learning networks such that they can model each individual WT. Various types of machine learning networks can be used but preferably, a deep neural network (DNN) is trained for each WT with both the source domain 602 and the target domain data 604. In this example embodiment as shown in FIGS. 5 and 6, the DNNs 606 may consist of an input layer, one or more hidden layers and an output layer with the purpose of reconstructing the input data itself.

Solving such an example of a modelling problem is equivalent to minimizing a reconstruction loss (RL), $$J^{\{i\}} = \|X^{\{i\}} - \hat{X}^{\{i\}}\|^2$$

where $\hat{X}^{\{i\}}$ denotes the reconstructed feature space by the DNN model.

The DNN for the i-th WT may therefore be parameterized by 608:

$$\{L, N, W^{\{i\}}, B^{\{i\}}\}$$

where L refers to the total number of hidden layers, $N=\{N_0, N_1, \ldots, N_{L+1}\}$ means the number of nodes of all layers with $N_0=N_{L+1}=r$ corresponding to the input layer and output layer.

$W^{\{i\}}=\{W_1^{\{i\}}, W_2^{\{i\}}, \ldots, W_{L+1}^{\{i\}}\}$ and $B^{\{i\}}=\{B_1^{\{i\}}, B_2^{\{i\}}, \ldots, B_{L+1}^{\{i\}}\}$ present weights and bias distributed across connections among all layers of the DNN models 606.

Such parameterization is motivated by an assumption that the homogeneous patterns and heterogeneous characteristics among K WTs can be modelled by a compromised $\{L, N\}$ and differentiated $\{W^{\{i\}}, B^{\{i\}}\}$.

FIG. 6 shows a general framework of an example model training process 600. In source domain learning, $D_{st}$ 514 and $D_{sv}$ 516 according to FIG. 5 are used to train a base DNN 606. The DNN structure may be self-organizing without a prior specification, in which details will be elaborated below with FIGS. 7 to 9.

Hyper-parameters of the base DNN 606, $\{L, N, W^{\{0\}}, B^{\{0\}}\}$ 608, may be automatically determined by two pre-specified thresholds, $\theta_1$ and $\theta_2$ 612. Then, in target domain learning 604, the $\{W^{\{i\}}, B^{\{i\}}\}, i=1, 2, \ldots, K$, can be finally obtained by optimizing the network parameters using back-propagation (BP) method based on $\{W^{\{0\}}, B^{\{0\}}\}$ as the initial values.

Figure 7:
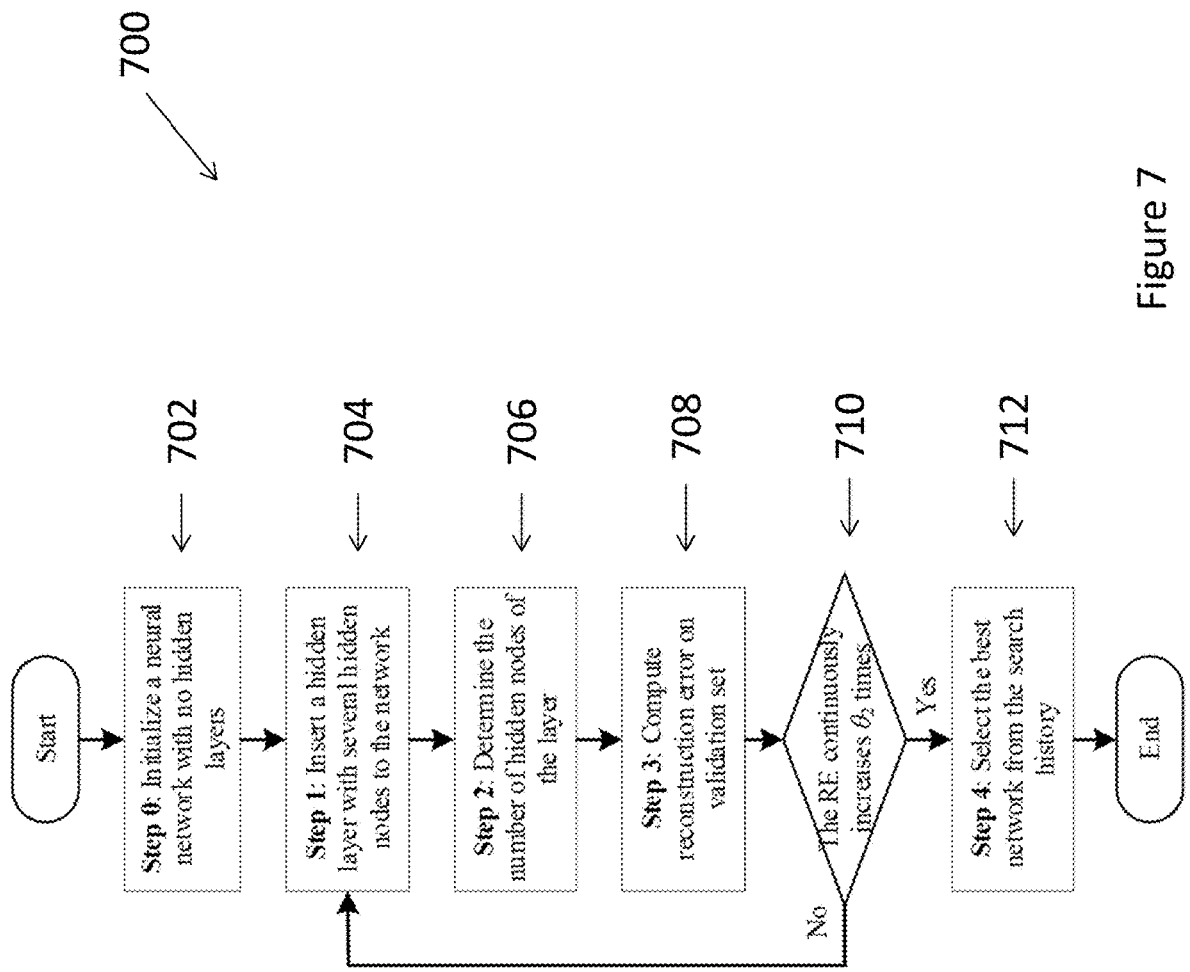
FIG. 7 is a flow diagram illustrating an example training process of a learning network for use with the device modelling engine of FIG. 3.

FIG. 7 shows an example process of the source domain training 700. In this example, the DNN structure in source domain learning is determined by self-expanding an initial network through continuously stacking hidden layers and units until a suitable size is achieved. The hyperparameter $\theta_1$ and $\theta_2$ 612 referred to in FIG. 6 may assist in deciding when to stop adding new hidden layers or hidden nodes.

At the beginning of source domain learning, a neural network may start with no hidden layers inside 702. However as the learning process begins, a hidden layer with several hidden nodes is inserted to the network 704, referring to the step 1. The number of hidden nodes on the inserted hidden layer is next determined 706 at the step 2. The step 1 704 and step 2 706 will be explained in detail later with reference to FIGS. 8 and 9.

Afterwards, the reconstruction error (RE) on validation set, $$R_v = \frac{1}{M_v} \sum_j \|X_j - \hat{X}_j\|^2$$

where $\hat{X}_j$ denotes the j-th reconstructed data point of $D_{sv}$ and $M_v$ means the data size of $D_{sv}$, is computed at step 3 to evaluate model performance 708. The network expansion procedure from step 1 through 3 may then be repeated, until $R_v$ continuously increases for $\theta_1$ times 710. Finally, the network causing the minimal $R_v$ in search history will be selected as the base DNN 712.

Figure 8:
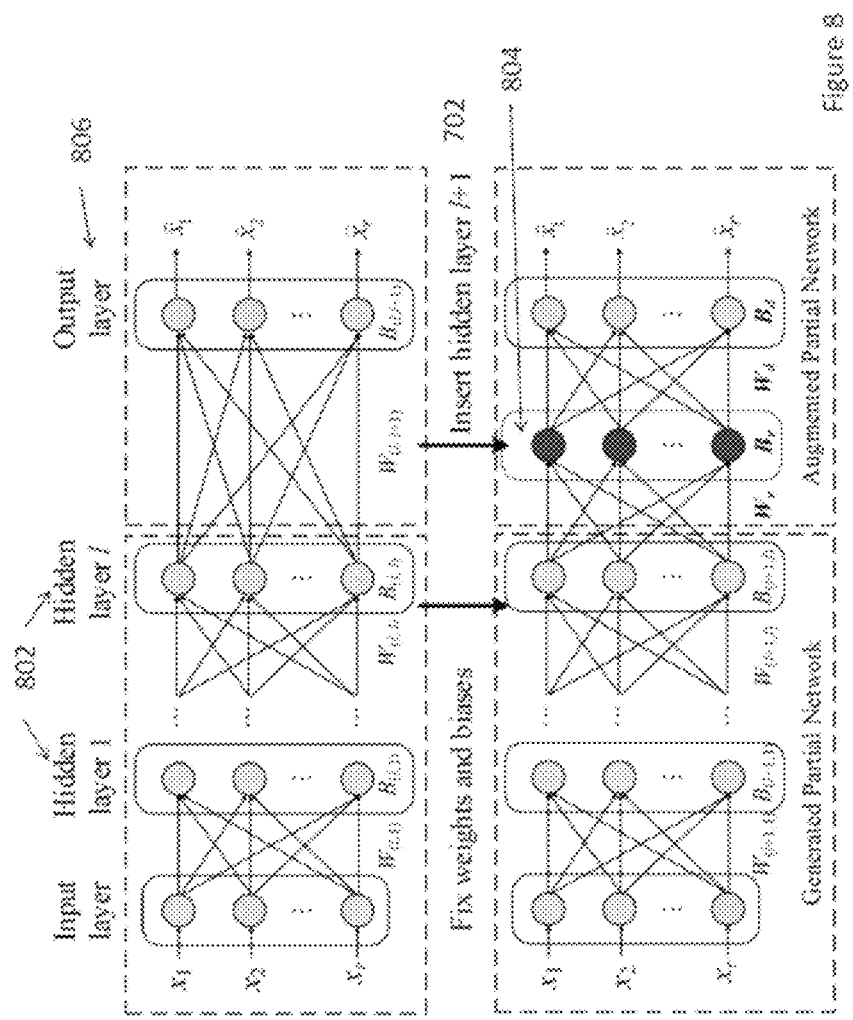
FIG. 8 is a diagram illustrating method steps of the training process of the learning network of FIG. 7; and, FIG. 9 is a diagram illustrating method steps of the training process of the learning network of FIG. 7.
Figure 9:
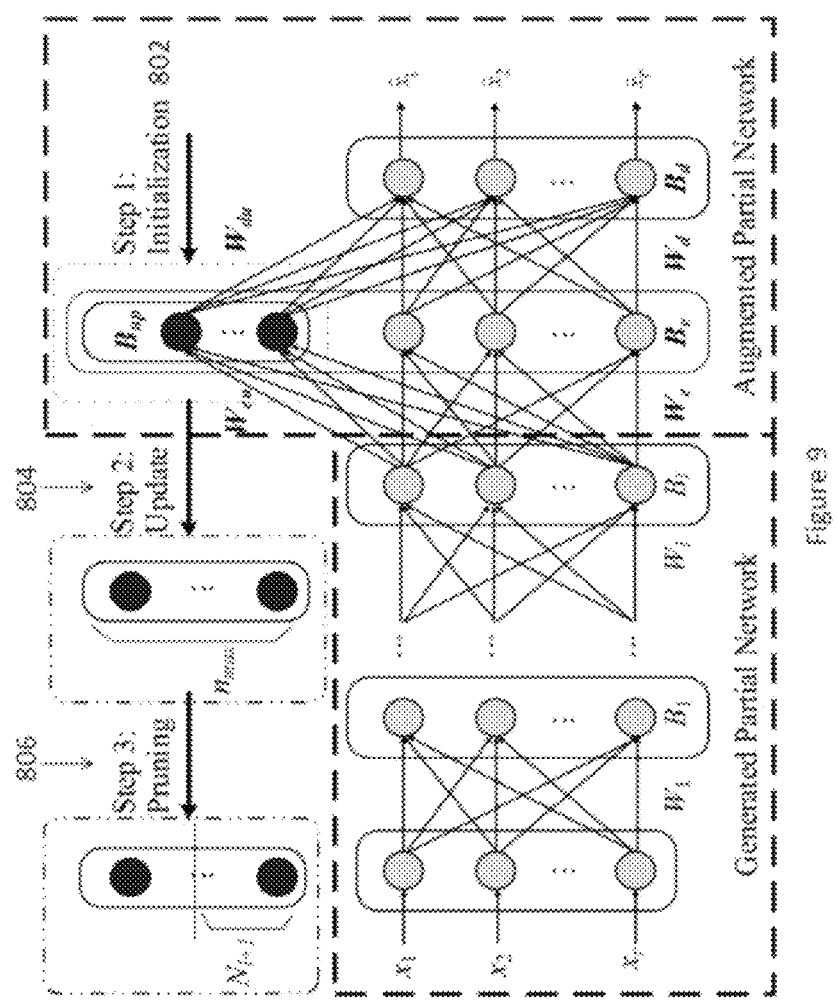

The manipulation of the DNN is represented by the diagrams of FIGS. 8 and 9, which shows a visual representation of the method of inserting a hidden layer, i.e. the step 1 702 in FIG. 7. Consider a DNN containing hidden layers 802, whose weights and biases can be represented as $W_l$ and $B_l$, while $W_{(l, i)}$ and $B_{(l, i)}$ denote the i-th weight and bias matrices in $W_l$ and $B_l$, $i=1, 2, \ldots, l+1$. A new hidden layer 804 may be inserted between the hidden layer 1 802 and output layer 806. In such operation, all elements of $W_l$ and $B_l$ except $W_{(l, l+1)}$ and $B_{(l, l+1)}$ are firstly inherited to $W_{l+1}$ and $B_{l+1}$. Meanwhile, weights, $\{W_e, W_d\}$ and biases, $\{B_e, B_d\}$, produced due to the insertion of a new hidden layer are also included into $W_{l+1}$ and $B_{l+1}$, where e stands for the encoder and d stands for the decoder.

The initial number of hidden nodes on this layer may be determined based on Principle Component Analysis (PCA) technique, which is a classical dimension reduction technique. A preferred embodiment of PCA in this invention is as follows:

1—compute the output of the hidden layer 1 by feeding $D_{st}$ into the original neural network using feedforward algorithm.

2—Set the initial number of hidden nodes of the said layer which may be initialized as the number of the greatest eigenvalues that can make up 80% of the sum of all eigenvalues obtained by PCA.

3—Determining the dimension of $\{W_e, W_d\}$ and $\{B_e, B_d\}$.

FIG. 9 shows the method of determining the number of hidden nodes, denoted as $N_{l+1}$, after inserting a compact hidden layer l+1 referring to the step 2 706 in FIG. 7. The expansion of the inserted hidden layer contains three steps:

Step 1. Initialize 802: add one or some hidden nodes on the inserted hidden layer. Denote the weights connecting the hidden layer l and these new hidden nodes as $W_{eu}$, and the weights connecting the new hidden nodes and the output layer as $W_{du}$, and the biases of the new hidden nodes as $B_{eu}$. At each update, $W_{eu}$, $W_{du}$ and $B_{eu}$ will be randomly initialized and aggregated to the $W_e$, $W_d$ and $B_e$, respectively.

Step 2. Update 804: train the weights and biases of the augmented partial network noted in FIG. 9. $W_e$, $W_d$, $B_e$ and $B_d$ will be trained using the gradient descent method while fixing the parameters from input layer to the hidden layer l, i.e. $\{W_1, \ldots, W_l\}$ and $\{B_1, \ldots, B_l\}$. Then, RE on validation set, $R_v^{\{l+1,n\}}$, where n means the number of current hidden nodes, will be computed. When $R_v^{\{l+1,n\}}$ continuously increases for $\theta_2$ times with increasing n, no more hidden nodes will be added and move to step 3; else move to step 1 to add more hidden nodes.

Step 3. Prune 806: determine $N_{l+1}$ and prune the redundant hidden nodes. Set $N_{l+1}$ as the n causing the minimal $R_v^{\{l+1,n\}}$. Retain the first $N_{l+1}$ hidden nodes and prune the rest. Update $W_e$, $W_d$ and $B_e$ to keep the corresponding rows or columns of the matrices. Finally, apply BP optimization to tune $\{W_e, W_d\}$ and $\{B_e, B_d\}$.

After the source domain learning, conduct the target domain learning according to FIG. 6. $\{W^{\{i\}}, B^{\{i\}}\}$ of the i-th WT DNN model are obtained by minimizing $J^{\{i\}}$ with the fine-tuning set $D_{tf}^{\{i\}}$. The BP method is applied to produce K DNN based WT models using $\{W^{\{0\}}, B^{\{0\}}\}$.

The fine-tuned models then can be used for condition monitoring of a wind turbine population. In a preferred embodiment of the invention, e.g. to monitor the condition of the i-th WT, the real-time SCADA data of the said WT will be fed into its DNN model to compute RE, which can be seen as an indicator of wind turbine health status. Let $R_t$ denote the RE at time t. We can use the exponentially weighted moving average (EWMA) chart to do condition monitoring. The control variable $z_t$ can be computed by $$z_t = \lambda R_t + (1-\lambda) z_{t-1}$$

where $\lambda \in (0, 1]$ is a weight of the historical RE, and $z_0$ can be the mean of REs for a period of monitoring. The mean and variance can be computed by:

$$\mu_z = \mu_R$$
$$\sigma_z^2 = \frac{\sigma_R^2}{n}\left(\frac{\lambda}{2-\lambda}\right)[1-(1-\lambda)^{2t}]$$

The upper and lower control limits can be computed by:

$$LCL(t) = \mu_z - L\sigma_z\sqrt{\frac{\lambda[1-(1-\lambda)^{2t}]}{(2-\lambda)n}}$$

$$LCL(t) = \mu_z - L\sigma_z\sqrt{\frac{\lambda[1-(1-\lambda)^{2t}]}{(2-\lambda)n}}$$

where L can be empirically set to 3 or any other suitable value.

When the control variable $z_t$ exceeds the upper or lower control limit, the monitored wind turbine can be considered as off-normal. The wind turbine should be identified as normal when $z_t$ is between the lower and upper limits.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for monitoring a device comprising the steps of:
    obtaining operation information from a device, wherein the operation information is associated with the condition of the device in operation; and
    processing the operation information with a device-specific matching network in a device modelling engine to determine or predict one or more operation conditions of the device; wherein the device modelling engine includes a plurality of device-specific matching networks each arranged for processing operation information associated with a respective one of the plurality of devices, the plurality of device-specific matching networks including the device-specific matching network; wherein each of the plurality of device-specific matching networks is generated by:
        training of a base matching network with a domain data set including operation information of the plurality of devices to generate a pre-trained base matching network, and
        training of the pre-trained base matching network with a target data set including operation information of the respective device.

2. The method for monitoring the device in accordance with claim 1, wherein the based matching network is a deep neural network.

3. The method for monitoring the device in accordance with claim 2, wherein the structure of the deep neural network is adjusted based on a stopping criterion.

4. The method for monitoring the device in accordance with claim 3, wherein the stopping criterion is determined based on a reconstruction error obtained from the deep neural network.

5. The method for monitoring the device in accordance with claim 4, wherein the reconstruction error is obtained by inputting the domain data set into the deep neural network.

6. The method for monitoring the device in accordance with claim 5, wherein the structure of the deep neural network is adjusted by inserting one or more hidden layers into the deep neural network.

7. The method for monitoring the device in accordance with claim 6, wherein the one or more hidden layers inserted by adding one or more hidden nodes into the hidden layers.

8. The method for monitoring the device in accordance with claim 7, wherein weights or biases of the deep neural network are manipulated when the deep neural network is adjusted.

9. The method for monitoring the device in accordance with claim 1, wherein the device is a wind turbine.

10. A system for monitoring a device comprising:
    a device conditions gateway arranged to obtain operation information from a device, wherein the operation information is associated with the condition of the device in operation; and
    a conditions monitoring engine arranged to process the operation information with a device-specific matching network in a device modelling engine to determine or predict one or more operation conditions of the device; wherein the device modelling engine includes a plurality of device-specific matching networks each arranged for processing operation information associated with a respective one of the plurality of devices, the plurality of device-specific matching networks including the device-specific matching network; wherein each of the plurality of device-specific matching networks is generated by:
        training of a base matching network with a domain data set including operation information of the plurality of devices to generate a pre-trained base matching network, and
        training of the pre-trained base matching network with a target data set including operation information of the respective device.

11. The system for monitoring the device in accordance with claim 10, wherein the based matching network is a deep neural network.

12. The system for monitoring the device in accordance with claim 11, wherein the structure of the deep neural network is adjusted based on a stopping criterion.

13. The system for monitoring the device in accordance with claim 12, wherein the stopping criterion is determined based on a reconstruction error obtained from the deep neural network.

14. The system for monitoring the device in accordance with claim 13, wherein the reconstruction error is obtained by inputting the domain data set into the deep neural network.

15. The system for monitoring the device in accordance with claim 14, wherein the structure of the deep neural network is adjusted by inserting one or more hidden layers into the deep neural network.

16. The system for monitoring the device in accordance with claim 15, wherein the one or more hidden layers inserted by adding one or more hidden nodes into the hidden layers.

17. The system for monitoring the device in accordance with claim 16, wherein weights or biases of the deep neural network are manipulated when the deep neural network is adjusted.

18. The system for monitoring the device in accordance with claim 17, wherein the device is a wind turbine.

19. The system for monitoring the device in accordance with claim 10, further comprising a pre-processor arranged to process the operation information obtained from the device conditions gateway.

20. The system for monitoring the device in accordance with claim 19, wherein the operation information is pre-processed before the information is inputted to the device modelling engine.

21. The system for monitoring the device in accordance with claim 20, wherein the operation information is pre-processed to remove fault data from the operation information.

22. The system for monitoring the device in accordance with claim 10, wherein the device conditions gateway is a SCADA system.

* * * * *